April 20, 1954 — A. H. BAILEY — 2,675,903
JUSTIFIER FOR TYPEWRITERS
Filed Sept. 9, 1950 — 4 Sheets-Sheet 1
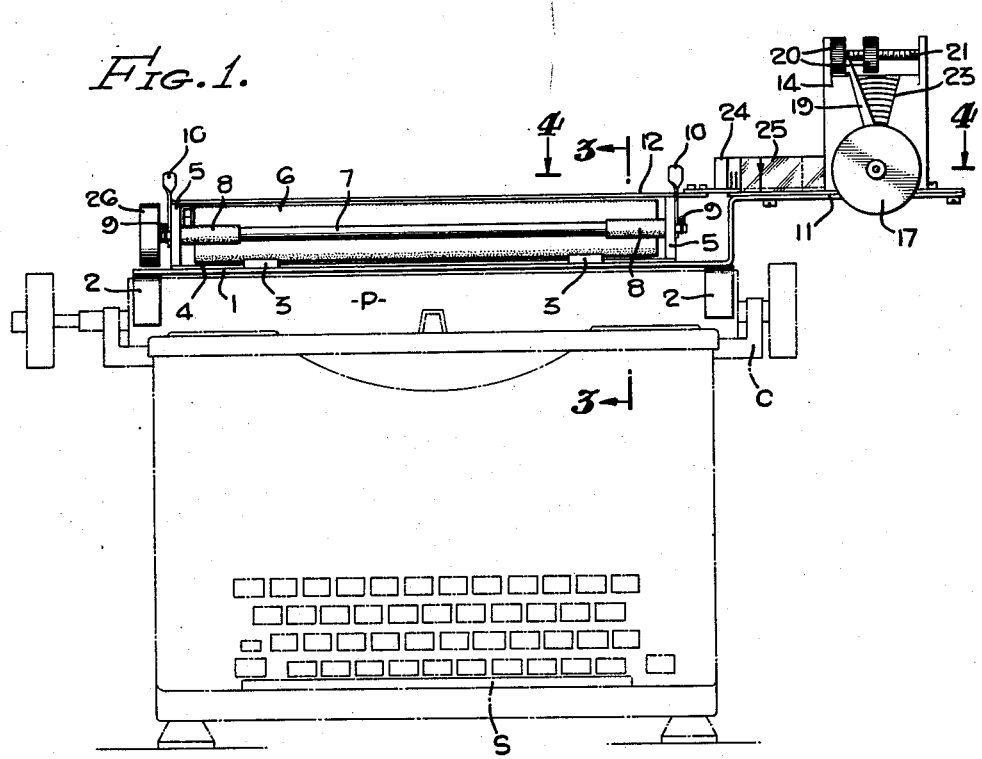
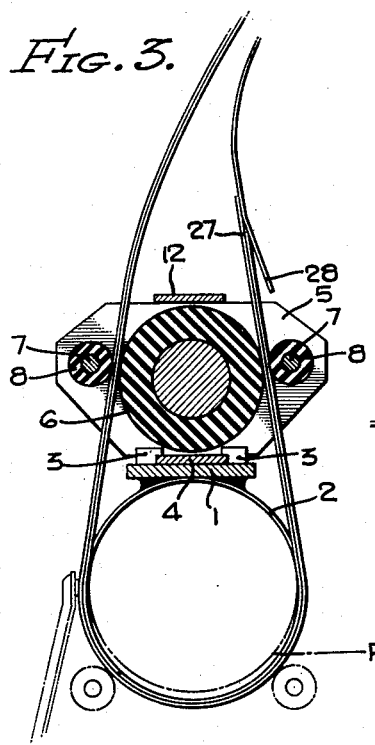
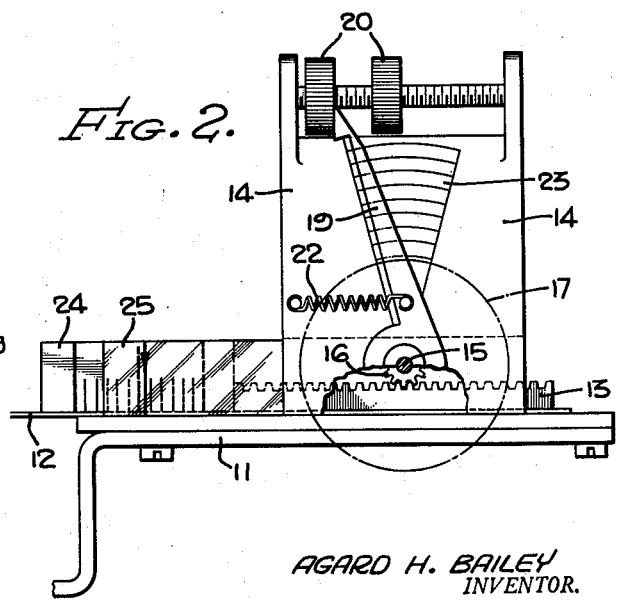
AGARD H. BAILEY
INVENTOR.
BY Lyon+Lyon
ATTORNEYS

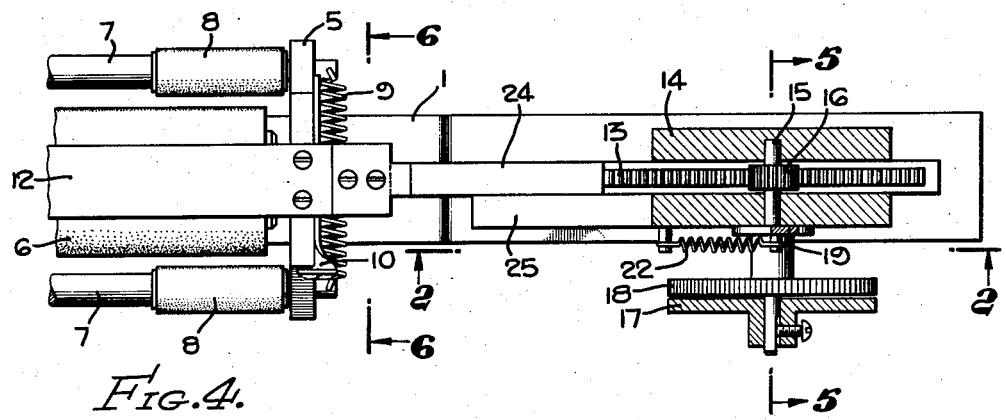
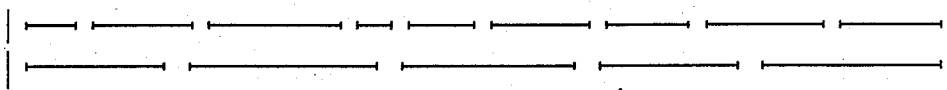
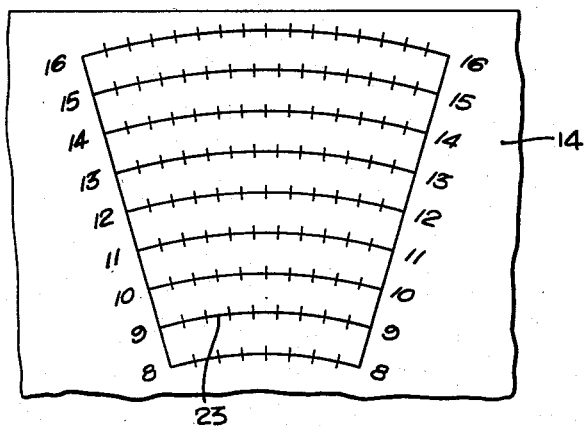
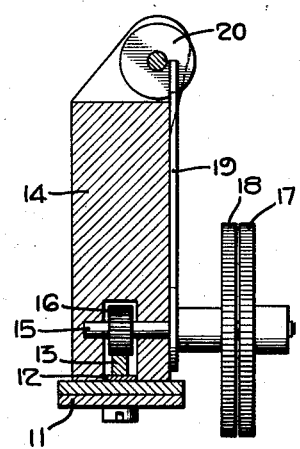
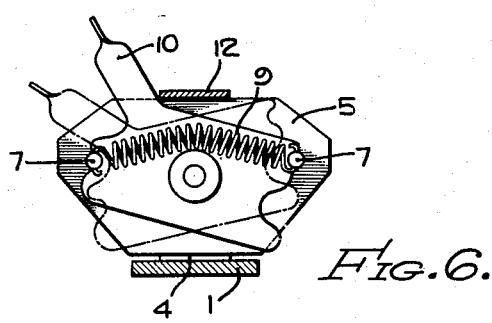
AGARD H. BAILEY
INVENTOR.
BY Lyon+Lyon
ATTORNEYS

AGARD H. BAILEY,
INVENTOR.

BY Lyon & Lyon
ATTORNEYS

April 20, 1954  A. H. BAILEY  2,675,903
JUSTIFIER FOR TYPEWRITERS

Filed Sept. 9, 1950  4 Sheets-Sheet 4

AGARD H. BAILEY
  INVENTOR.

BY Lyon & Lyon
  ATTORNEYS

Patented Apr. 20, 1954

2,675,903

UNITED STATES PATENT OFFICE 2,675,903

JUSTIFIER FOR TYPEWRITERS

Agard H. Bailey, Los Angeles County, Calif., assignor to California Institute Research Foundation, Pasadena, Calif., a corporation of California Application September 9, 1950, Serial No. 184,040

12 Claims. (Cl. 197—84)

My invention relates to justifiers for typewriters; that is, to devices for shifting a line of typing a pre-selected distance between words so as to shorten or lengthen the line, and thus bring the right hand margin of a column of typing to a uniform length. Included in the objects of my invention are:

First, to provide a justifier which may be readily and quickly mounted on or removed from a conventional typewriter without the use of tools and which in no manner interferes with the conventional use of the typewriter.

Second, to provide a justifier which may be quickly adjusted for various spacings and which is so arranged that the user may check each line as it is typed to verify if the spacing selected is correctly justifying the line.

Third, to provide a justifier which may be arranged as a device added to a conventional typewriter platen or may be arranged to incorporate a special platen to be substituted for a conventional platen on those typewriters which are provided with removable platens.

Fourth, to provide a justifier for typewriters which incorporates a novel scale and control adapted to be mounted at one end of the carriage or at one side of the typewriter keys.

With the above and other objects in view as may appear hereinafter, reference is directed to the accompanying drawings in which Figure 1 is a front elevational view of one form of my typewriter justifier, a typewriter being indicated by broken outline.

Figure 2 is an enlarged fragmentary, partial sectional, partial elevational view taken through 2—2 of Figure 4.

Figure 3 is an enlarged transverse, sectional view taken through 3—3 of Figure 1, showing the manner of mounting the auxiliary platen and indicating a special backing sheet useful in holding the work-sheet on which the typing is placed.

Figure 4 is an enlarged, partial sectional, partial plan view taken through 4—4 of Figure 1.

Figure 5 is a sectional view through 5—5 of Figure 4.

Figure 6 is a sectional view through 6—6 of Figure 4.

Figure 7 is a diagrammatical view indicating the manner in which justification of a line of typing is effected.

Figure 8 is an enlarged, fragmentary view of the block or support on which the justifier scale is placed showing particularly the scale.

Figure 9:
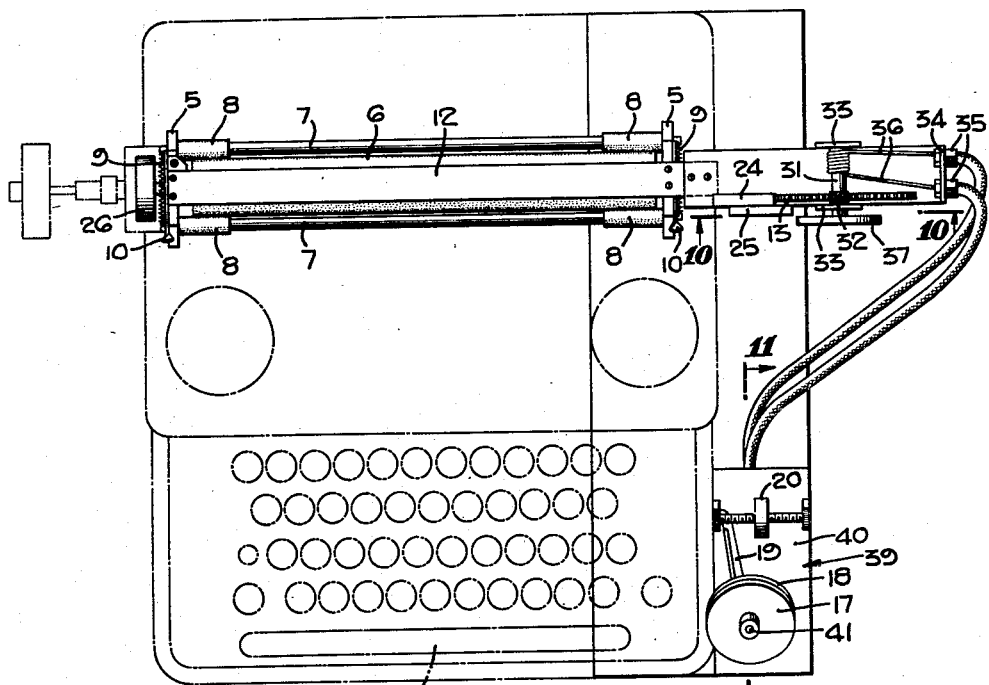
Figure 9 is a plan view of a modified form of my typewriter justifier, the typewriter being indicated in broken lines.

Reference is first directed to the construction shown in Figures 1–8 inclusive.

In this construction a sub-frame 1 is provided which is adapted to overlie the conventional platen P of a typewriter. The sub-frame is provided with U-shaped spring clips 2 which fit over the extremities of the conventional platen. The clips while holding the sub-frame permit rotation of the platen P.

Slidably mounted in guides 3 on the sub-frame 1 for lateral movement relative to the typewriter is a platen frame 4. The platen frame includes end plates 5 which journal an auxiliary platen 6 equipped at one end with a knob 26 and ratchet means in the manner of a conventional platen. The end plates also support tension roller shafts 7 which carry tension rollers 8 adapted to bear against the auxiliary platen 6. Springs 9 link the shafts 7 together to provide bearing pressure between the rollers 8 and the auxiliary platen. Release levers 10 are pivotally supported on the end plates 5 to force the shafts 7 apart and thereby to free the rollers 8.

The sub-frame 1 is provided with an offset arm 11 so arranged as to extend upwardly over and beyond one end of the typewriter carriage C. The platen frame 4 is provided with a top bar 12 which extends laterally to a point adjacent the offset arm 11.

Secured to the top bar 12 and extending therefrom over the offset arm 11 is a rack 13. Secured to the offset arm and provided with a slot clearing the rack 13 is an upright mounting block 14 which carries a pinion shaft 15 on which is mounted a pinion 16 engageable with the rack 13.

By this arrangement rotation of the shaft 15 causes relative movement of the rack 13 and arm 11 to effect lateral displacement of the auxiliary platen with respect to the main platen of the typewriter.

Secured to the outer or forward end of the pinion shaft 15 is a fixed hand wheel 17 having a knurled periphery. Journalled on the shaft 15 is a free hand wheel 18, also having a knurled periphery. The hand wheel 18 is disposed contiguous to the hand wheel 17 so that either or both may be grasped in the fingers. Secured to a hub which extends rearwardly from the free hand wheel is a scale arm or pointer 19. The upper extremity of the arm 19 is restrained between the stops 20 in the form of hand nuts screw threaded on a screw shaft 21 supported by the bosses projecting upwardly from the mounting block 14. A spring 22 urges the arm in one direction.

The screw shaft 21 is parallel with the rack and the stops 20 control the arc of movement of the scale arm 19. Engraved or otherwise formed on or secured to the mounting block 14 is a measuring scale 23 shown best in Figure 8. The scale comprises an arcuate segment divided into a series of arcuate rows having a common center coinciding with the shaft 15. Beginning at the bottom, these rows are numbered eight to sixteen representing a range of possible spaces between words of a line of typing. Each row is divided equally into spaces corresponding to the numerals appearing at the end of each row. Operation of the hand wheels and scale will be brought out in more detail hereinafter.

Mounted on the rack 13 and forwardly of the rack on the arm 11 are auxiliary scale blocks 24 and 25 formed of transparent material. Marked on the block 24 are lines representing the conventional spacing between letters typed by the typewriter. The forward scale block 25 is provided with a reference line.

Operation of my typewriter justifier shown in Figures 1–8 is as follows:

The sub-frame is mounted by means of the clips 2 on the conventional typewriter platen P. The paper or stencil to be typed is first threaded downwardly between the auxiliary platen and the rearward tension rollers 8 thereof, then around the conventional platen and upwardly between the auxiliary platen and the forward set of tension rollers.

The tension rollers are then set and the conventional tension release is set in its released position so that paper may feed freely around the conventional platen when the auxiliary platen is rotated by means of a knob 26 at one end thereof. This also permits the necessary lateral displacement of the paper. In the use of my justifier, it is preferred, though not necessary, to use a backing sheet 27 having a lip 28 under which an edge of the paper to be typed may be inserted. This permits typing close to the top of the paper.

In the use of the justifier, the text is first typed in the conventional manner and notations (preferably as fractions) are made opposite each line indicating the number of spaces to be subtracted or added in order to bring all of the lines to equal length and the number of intervals between words among which the total correction to be made is apportioned. For example assuming a line to be five spaces short and containing fourteen words the notation may be $+5/13$. With this copy as a guide, the paper is adjusted in the carriage with the reference line of the scale block 25 in registry with the left hand end of the spacing scale of the block 24. The previously typed copy is then examined to note the number of words in the first line and the number of spaces which must be added or subtracted. The stops 20 are then adjusted so that the arm 19 is movable between selected marks of a corresponding row of the scale 23. Carrying forth the example of a line five spaces short and containing fourteen words $(+5/13)$, row 13 of the scale is selected and the stops are adjusted to permit movement of the arm 19 five spaces. With this setting a correction of $5/13$ of a space may be made in each interval.

The line is then typed in the usual manner except that at the end of each word and operation of the space bar S of the typewriter, the rack is moved an amount equal to the selected spacing.

This is accomplished by grasping both the fixed hand wheel and free hand wheel utilizing the fingers as a clutch to turn both wheels in unison clockwise. When the fingers are released, the free hand wheel returns to position under urge of the spring 22 or may be moved manually if the spring is omitted. Thus it will be seen that the spacing between words may be varied by predetermined amounts as represented diagrammatically in Figure 7 so that the resultant length of line will be the same and the right hand margin will be uniform.

If, for example, the line was five spaces long, the notation might be $-5/13$. In this case, the reference line of block 25 is set opposite the fifth line of the block 24. Then, after each word and operation of the space bar, the wheels are moved in unison counterclockwise to subtract $5/13$ of a space.

Figure 10:
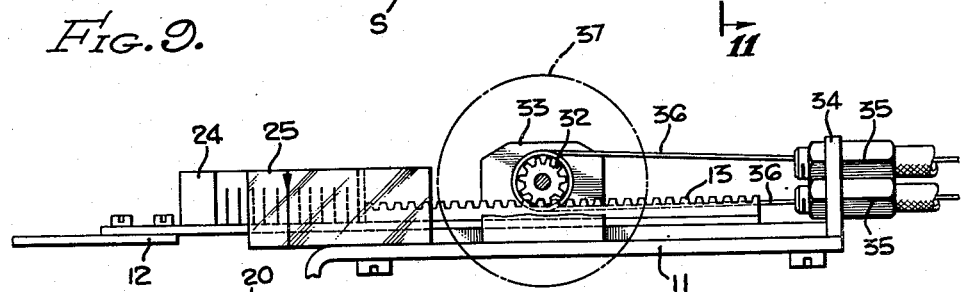
Figure 10 is a partial sectional, partial elevational view thereof taken along the line of 10—10 of Figure 9.
Figure 11:
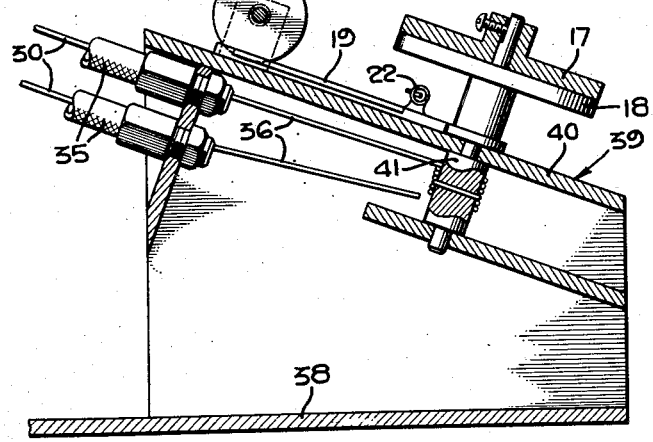
Figure 11 is a sectional view thereof through 11—11 of Figure 9.
Figure 12:
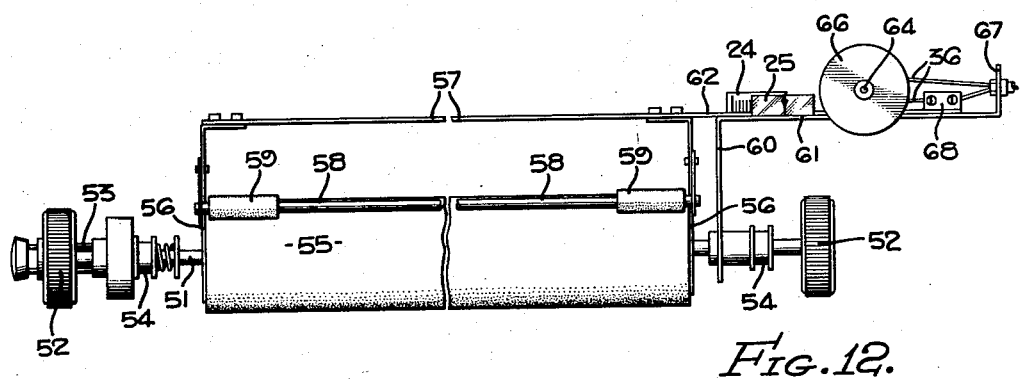
Figure 12 is a front, elevational view of a further modified form of my typewriter justifier adapted for typewriters having removable platens.
Figure 13:
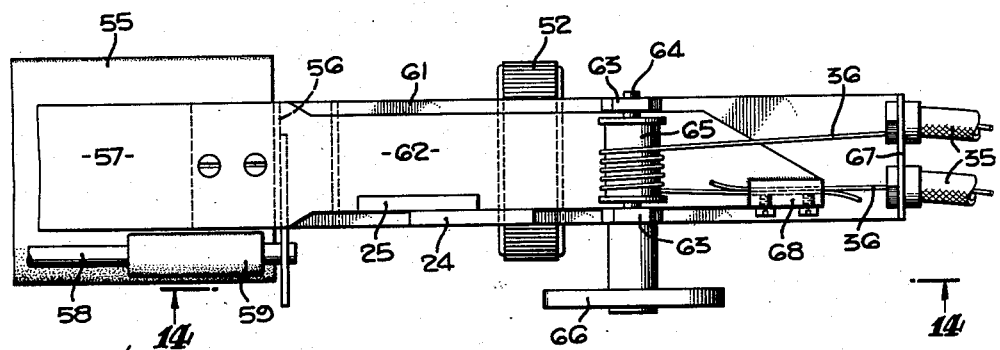
Figure 13 is an enlarged fragmentary plan view thereof.
Figure 14:
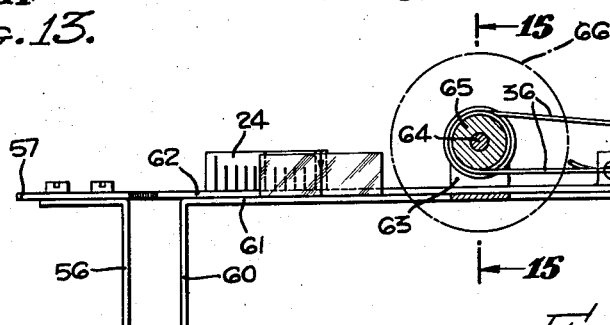
Figure 14 is a partial sectional, partial elevational view thereof taken along the line 14—14 of Figure 13.
Figure 15:
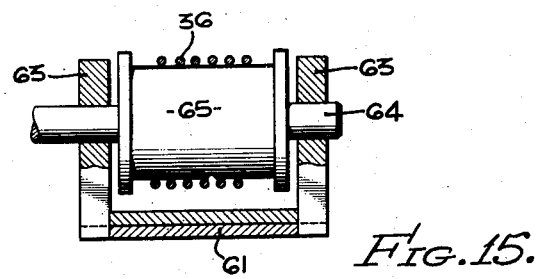
Figure 15 is a sectional view through 15—15 of Figure 14.

Reference is now directed to the construction shown in Figures 9, 10, 11. In many respects the construction here shown is the same as the previously described structure except that the control means including the hand wheels are located at one side of the typewriter adjacent the space bar.

In the construction shown in Figures 9–11, the mounting block 14 is omitted and a drum 31 carrying a pinion 32 engageable with the rack 13 is mounted between bearings 33 carried by the offset arm 11. In this construction, the extremity of the offset arm is provided with a bracket plate 34 which supports the extremities of a pair of cable guides 35. A cable 36 is threaded through these guides and wrapped around the drum 31. The cable is suitably anchored to the drum to avoid slippage.

For convenience, a hand wheel 37 may be mounted on an extension of the drum 31. Secured to a plate 38 which may be adapted to slide under and be retained by the typewriter is a housing 39 having means for securing the other extremities of the cable guides 35. The housing includes a sloping upper deck 40 and supports a shaft 41 disposed normal thereto and provided with a drum portion around which the cable 36 is wrapped and secured.

Mounted above the deck 40 on the shaft 41 is the fixed hand wheel 17 and free hand wheel 18 similar to the first described structure. In addition, there is provided the scale arm 19 as well as the measuring scale and screw shaft. In this case, only a single adjustable stop 20 is shown as the arm may always occupy a normal position adjacent one margin of the scale. The cable 36 is so arranged that rotation of the shaft 41 will effect corresponding relative movement of the rack 13 and arm 11 as in the first described structure.

Reference is now directed to Figures 12–15 inclusive.

Many makes of typewriters, particularly the newer typewriters are provided with platens which may be readily removed. In such cases, it is unnecessary to employ an auxiliary platen; instead, a replacement or substitute platen may be provided.

The substitute platen assembly includes a shaft 51 having conventional hand wheels 52, clutch 53, and journals 54 corresponding to the conventional platen assembly. In place of the conventional platen, a special platen 55 is provided which is slidably—but non-rotatably—mounted on the shaft 51. The platen 55 is mounted between end plates 56 connected by a top bar 57. The end plates may support a tension roller shaft 58 carrying tension rolls 59 in the manner of the conventional platen assembly.

Journalled on the substitute platen shaft 51, but held against axial displacement thereon by collars or other suitable means is a bracket 60 which extends upwardly and includes a laterally directed arm 61. The arm 61 and top bar 57 correspond to the arm 11 and top bar 12, and may therefore be provided with the control means shown in Figures 1–8 or in Figures 9–11.

However, a modified control means is illustrated. In this case, the top bar 57 includes an extension 62 which overlies the arm 61. The arm 61 carries bearings 63 which straddle the arm 61 and journal a shaft 64 and drum 65. A hand wheel 66 may also be provided. The extremity of the arm 61 is provided with a mounting bracket 67, which supports cable guides 35 such as shown in Figures 9–11. The guides receive a cable 36 which is wrapped about the drum. In this case, the ends of the cable are secured to an anchor 68 provided in the extremity of the extension 62 between the drum 65 and the mounting bracket 67. The cable 36 and cable guides are connected with the control means shown in Figure 11 and previously described herein.

It should be observed that if desired by the manufacturer of the typewriter, the "substitute" platen may be a permanent part of the machine.

It should also be observed that if the number of spaces in a line be less than eight, the correction fraction is changed to one whose denominator is shown on the scale. For example, $\tfrac{3}{5}$ becomes $\tfrac{6}{10}$; $\tfrac{2}{6}$ becomes $\tfrac{4}{12}$; $\tfrac{1}{7}$ becomes $\tfrac{2}{14}$.

Having thus described certain embodiments and applications of my invention, I do not desire to be limited thereto, but intend to claim all novelty inherent in the appended claims.

I claim:

1. The combination with a typewriter, having a carriage adapted to advance a predetermined distance with each operation of its space bar whereby the words of a line of typing may be separated a predetermined distance, of a justifier attachment involving: a platen movable laterally with respect to said carriage; juxtapositioned members fixed with respect to said carriage and said platen, adapted for limited relative movement to shift said platen; a manually operated means for effecting relative movement of said members, including a hand wheel; an adjustable stop means and an arm movable a predetermined distance set by said stop means; and a second wheel connected to said arm and disposed adjacent said hand wheel for engagement simultaneously therewith, whereby said members and said platen and carriage may be moved relatively a distance determined by said stop means, and said platen shifted in conjunction with each operation of said space bar to alter the effective spacing between words in a line of typing.

2. The combination with a typewriter, having a carriage adapted to advance a predetermined distance with each operation of its space bar whereby the words of a line of typing may be separated a predetermined distance, of a justifier attachment involving: a platen movable laterally with respect to said carriage; a pair of relatively movable members secured respectively to said platen and said carriage and extending laterally beyond one side of said carriage; means for effecting relative movement of said members to cause lateral displacement of said platen so as to alter the spacing effected by said space bar; and an adjustable stop means and a reference scale for preselecting the extent of relative movement of said members and the corresponding displacement of said platen.

3. The combination with a typewriter, having a carriage adapted to advance a predetermined distance with each operation of its space bar whereby the words of a line of typing may be separated a predetermined distance, of a justifier attachment involving: an auxiliary platen assembly including relatively movable frames, a pair of spring clips carried by one of the frames and adapted to fit on the conventional platen of a typewriter to secure said frame relative to the carriage thereof, a platen journalled in the other frame and capable of lateral displacement relative to the first frame and carriage; said frames also including juxtaposed arm members extending from one end of said carriage; manually operated means for effecting relative movement of said members; and an adjustable stop means for gaging the relative movement of said members thereby to regulate the lateral shifting of said platen, whereby said platen may be shifted a predetermined amount in conjunction with each operation of said space bar to alter the effective spacing between words in a line of typing.

4. The combination with a typewriter, having a carriage adapted to advance a predetermined distance with each operation of its space bar whereby the words of a line of typing may be separated a predetermined distance, of a justifier attachment involving: an auxiliary platen assembly including relatively movable frames, a pair of spring clips carried by one of the frames, and adapted to fit on the conventional platen of a typewriter to secure said frame relative to the carriage thereof, a platen journalled in the other frame and capable of lateral displacement relative to the first frame and carriage; said frames also including juxtaposed arm members extending from one end of said carriage; a manually operated means for effecting relative movement of said members, including a hand wheel; an adjustable stop means and an arm movable a predetermined distance set by said stop means; and a second wheel connected to said arm and disposed adjacent said hand wheel for engagement simultaneously therewith; whereby said members and said platen and carriage may be moved relatively a distance determined by said stop means, and said platen shifted in conjunction with each operation of said space bar to alter the effective spacing between words in a line of typing.

5. The combination with a typewriter, having a carriage adapted to advance a predetermined distance with each operation of its space bar whereby the words of a line of typing may be separated a predetermined distance, of a justifier attachment involving: an auxiliary platen assembly including relatively movable frames, a pair of spring clips carried by one of the frames, and adapted to fit on the conventional platen of a typewriter to secure said frame relative to the carriage thereof, a platen journalled in the other frame and capable of lateral displacement relative to the first frame and carriage; said frames also including juxtaposed arm members extending from one end of said carriage; means for effecting relative movement of said members to cause lateral displacement of said platen so as to alter the spacing effected by said space bar; and an adjustable stop means and a reference scale for preselecting the extent of relative movement of said members and the corresponding displacement of said platen.

6. The combination with a typewriter, having a carriage adapted to advance a predetermined distance with each operation of its space bar whereby the words of a line of typing may be separated a predetermined distance, of a justifier attachment involving: an auxiliary platen assembly including relatively movable frames, a pair of spring clips carried by one of the frames, and adapted to fit on the conventional platen of a typewriter to secure said frame relative to the carriage thereof, a platen journalled in the other frame and capable of lateral displacement relative to the first frame and carriage; said frames also including juxtaposed arm members extending from one end of said carriage; a hand control for said arm members adapted to be disposed at one side of the space bar; and mechanical connecting means between said control and said arm members; said control including an adjustable stop and pointer to effect predetermined lateral displacements of said platen, whereby on operation in conjunction with said space bar the spacing between words of a line of typing may be varied.

7. The combination with a typewriter, having a carriage adapted to advance a predetermined distance with each operation of its space bar whereby the words of a line of typing may be separated a predetermined distance, of a justifier attachment involving: a platen assembly adapted to be substituted for the conventional platen of a typewriter, said platen assembly including a platen shiftable laterally with respect to the carriage of the typewriter; cooperating arm members fixed relative to said carriage and said platen respectively extending above and to one side of said carriage; manually operated means for effecting relative movement of said members; and adjustable stop means for gaging the relative movement of said members thereby to regulate the lateral shifting of said platen, whereby said platen may be shifted a predetermined amount in conjunction with each operation of said space bar to alter the effective spacing between words in a line of typing.

8. The combination with a typewriter, having a carriage adapted to advance a predetermined distance with each operation of its space bar whereby the words of a line of typing may be separated a predetermined distance, of a justifier attachment involving: a platen assembly adapted to be substituted for the conventional platen of a typewriter, said platen assembly including a platen shiftable laterally with respect to the carriage of the typewriter; cooperating arm members fixed relative to said carriage and said platen respectively extending above and to one side of said carriage; a manually operated means for effecting relative movement of said members, including a hand wheel; an adjustable stop means and an arm movable a predetermined distance set by said stop means; and a second wheel connected to said arm and disposed adjacent said hand wheel for engagement simultaneously therewith, whereby said members and said platen and carriage may be moved relatively a distance determined by said stop means, and said platen shifted in conjunction with each operation of said space bar to alter the effective spacing between words in a line of typing.

9. The combination with a typewriter, having a carriage adapted to advance a predetermined distance with each operation of its space bar whereby the words of a line of typing may be separated a predetermined distance, of a justifier attachment involving: a platen assembly adapted to be substituted for the conventional platen of a typewriter, said platen assembly including a platen shiftable laterally with respect to the carriage of the typewriter; cooperating arm members fixed relative to said carriage and said platen respectively extending above and to one side of said carriage; means for effecting relative movement of said members to cause lateral displacement of said platen so as to alter the spacing effected by said space bar; and an adjustable stop means and a reference scale for preselecting the extent of relative movement of said members and the corresponding displacement of said platen.

10. The combination with a typewriter, having a carriage adapted to advance a predetermined distance with each operation of its space bar whereby the words of a line of typing may be separated a predetermined distance, of a justifier attachment involving: a platen assembly adapted to be substituted for the conventional platen of a typewriter, said platen assembly including a platen shiftable laterally with respect to the carriage of the typewriter; cooperating arm members fixed relative to said carriage and said platen respectively extending above and to one side of said carriage; a hand control for said arm members adapted to be disposed at one side of the space bar; and mechanical connecting means between said control and said arm members; said control including an adjustable stop and pointer to effect predetermined lateral displacements of said platen, whereby on operation in conjunction with said space bar, the spacing between words of a line of typing may be varied.

11. A justifier attachment for typewriters having a carriage and a main platen mounted therein, comprising: a rotatable auxiliary platen; a frame journaling said auxiliary platen and having means for mounting on said main platen, said means permitting rotation of said main platen; means for manually shifting said frame on said mounting means for effecting movement of said auxiliary platen axially relative to said main platen to supplement movement of said carriage; and adjustable stop means for regulating the extent of movement of said auxiliary platen.

12. The combination with a typewriter having a space bar and a carriage including a rotatable main platen wherein said carriage is adapted to advance a predetermined distance with each operation of said space bar to separate a predetermined distance the words of a line of typing, of a justifier attachment involving: a rotatable auxiliary platen; a frame journaling said auxiliary platen and having means mounted on said main platen, said means permitting rotation of said main platen; said frame being movable relative to said means to permit axial movement of said auxiliary platen relative to said main platen to alter the effective spacing of said space bar; means settable to predetermine a series of lateral movements for said auxiliary platen; and means controlled by said settable means and repeatedly operable to move said frame and auxiliary platen in conjunction with operation of said space bar thereby to alter the spacing between words of a line of typing.

References Cited in the file of this patent

UNITED STATES PATENTS

| Number | Name | Date |
|---|---|---|
| 2,162,565 | Ritterholz | June 13, 1939 |
| 2,202,869 | Robinson, Jr. et al. | June 4, 1940 |
| 2,206,583 | Smith | July 2, 1940 |